United States Patent [19] [11] 3,915,253
Ott et al. [45] Oct. 28, 1975

[54] LOAD SENSING STEERING SYSTEM

[75] Inventors: James I. Ott, Portland, Oreg.; Delmar G. Schwab, Milwaukie, Oreg.

[73] Assignee: Hyster Company, Portland, Oreg.

[22] Filed: Feb. 15, 1974

[21] Appl. No.: 443,127

[52] U.S. Cl. ............... 180/79.2 R; 60/384; 60/452
[51] Int. Cl.² ............................................ B62D 5/06
[58] Field of Search .......... 180/79.2 R; 60/452, 450, 60/384

[56] References Cited
UNITED STATES PATENTS

| | | | |
|---|---|---|---|
| 2,892,312 | 6/1959 | Allen et al. | 60/450 |
| 3,528,521 | 9/1970 | Ellis | 180/79.2 R |

FOREIGN PATENTS OR APPLICATIONS

| | | | |
|---|---|---|---|
| 152,865 | 12/1955 | Sweden | 180/79.2 R |

Primary Examiner—Leo Friaglia
Assistant Examiner—John A. Pekar
Attorney, Agent, or Firm—Francis Swanson

[57] ABSTRACT

A hydraulic steering system for an industrial lift truck or other type vehicles is disclosed. The system embodies a variable displacement pump operatively connected to a system which senses the hydraulic pressure in the steering cylinder. The system automatically varies the stroke and pressure of the hydraulic pump in accordance with steering requirements.

3 Claims, 1 Drawing Figure

LOAD SENSING STEERING SYSTEM

BACKGROUND OF THE INVENTION

1. Field of the Invention

The invention relates to hydraulically powered vehicle steering systems in general, and more particularly those steering systems incorporated in industrial trucks.

2. Description of the Prior Art

Hydraulically powered steering systems are well known in the art. One such system employs a fixed displacement pump and a circuit having an open center steering valve to control the direction of oil to the steering load. The pump output is a function of the speed of the prime mover which may be an electric motor or an internal combustion engine. Oil flows continuously through this system independent of a demand for flow at the steering cylinder. When the steering valve is opened, creating a demand for flow and pressure at the steering cylinder, the total output of the pump often exceeds demand. Excess oil is sent through the open center bypass circuit and wasted. Oil is also wasted when the steering cylinder is stalled and the flow sent at high pressure over the system relief valve.

Another common system utilizes a variable displacement constant pressure compensated pump in a circuit having a closed center steering valve to control the direction of oil to the steering load. In this system, pressure is independent of the demand at the steering cylinder, while flow delivered is only that demanded by the steering cylinder. The excess pressure is throttled across the steering valve. This results in metering power loss during steering actuation. It also generates excess heat and noise. Additional unnecessary power consumption occurs when the cylinder is stalled, as the pump assumes a zero flow condition but maintains high pressure.

Both of the described systems waste power and generate noise and heat.

SUMMARY OF THE INVENTION

The problems of prior art vehicular steering systems are obviated by the present invention. The disclosed invention incorporates a steering load sensing line operatively connected to a variable displacement pump, in a closed center hydraulic circuit.

A principal object of the invention is to provide means to automatically match pump pressure and flow output with steering load demand. A second object is to provide a steering system that offers increased efficiency by eliminating excess flow and minimizing metering pressure losses. Another object of the invention is to, in electric vehicles, extend battery charge life by reducing power consumption in the vehicle steering system. A further object of the invention is to reduce the generation of heat in the steering system through a reduction in hydraulic power losses.

BRIEF DESCRIPTION OF THE DRAWINGS

Other objects and advantages of the present invention will become more apparent to those skilled in the art from the following detailed description which proceeds with reference to the accompanying drawing wherein.

DETAILED DESCRIPTION

Figure 1:
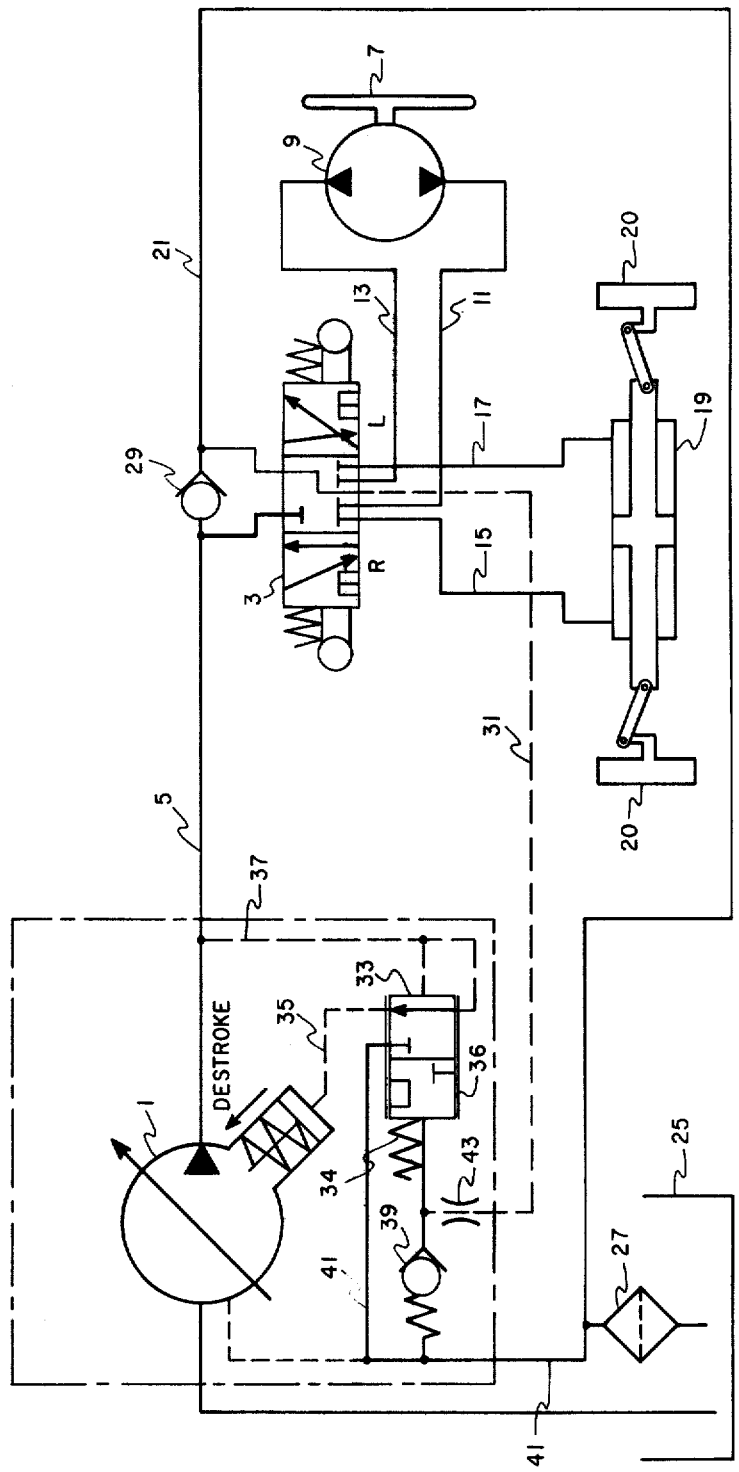
FIG. 1 is a hydraulic schematic showing a preferred embodiment of the steering system.

Arrangement of the Steering System in an Industrial Lift Truck

With reference to the drawing, FIG. 1 discloses a variable displacement load sensing system having a variable displacement power pump 1 which is operatively connected to a steering valve 3 by a hydraulic line 5. A steering wheel 7 is operatively connected to a hand pump 9 which is connected by hydraulic fluid passages 11 and 13 to steering valve 3. Hydraulic lines 15 and 17 are operatively connected to steering cylinder 19 which is connected to the vehicle steering wheels 20. Hydraulic line 21 runs from the valve 3 to the sump 25 and contains a filter 27. Check valve 29 is interposed between line 5 and line 21 for emergency steering in the event the power pump 1 should become inoperative. A steering load pilot line 31 is connected to the steering valve 3 and to a pressure compensator valve 33. The pressure compensator valve 33 automatically directs oil to the stroking mechanism of the power pump 1 by a passage 35, in response to the shifting of valve 3. A pilot relief valve 39 allows oil, in appropriate circumstances, to return to sump 25 by line 41 which also drains the case of pump 1.

OPERATION OF THE SYSTEM

When the steering valve 3 is in the neutral position, fluid flow in hydraulic line 5 is blocked. In this position hydraulic pressure in line 5 is directed through passage 37 to valve 33. Since pressure in pilot line 31 is drained to tank 25 the pressure in passage 37 will shift spool 36 of pressure compensator valve 33 in opposition to the resistance of spring 34 into the destroking position. In this position oil will be directed into passage 35. This will cause pump 1 to assume a zero stroke position against the predetermined force of spring 34. For example, the load of spring 34 may be 150 psi. Assume not that the operator wishes to execute a turn to the left. He will turn the steering wheel 7 which will cause steering valve 3 to shift to the left position L. Fluid will now flow through line 5 and valve 3 through line 11 to hand pump 9. From pump 9 the fluid will pass into line 13 through the L position of valve 3 into line 17 and on to cylinder 19 which will cause the cylinder piston 20 to shift to the left. This will cause the vehicle wheels 20 to turn in the appropriate direction. As soon as valve 3 assumes position L the steering load is sensed by pilot line 31. This pressure is directed against spool 36 of the pressure compensator valve 33. This pressure adds to the force of spring 34 already acting on spool 36. If pump pressure is less than the combined pressure in line 31 and the force of spring 34 the spool 36 will shift to the stroke-increase position. In this position, oil will drain from passage 35 into sump 25 via line 41. This will cause pump 1 to increase stroke and thus increase input flow. The increased stroke will cause pressure in line 5 and passage 37 to increase until it is equal to the sum of the steering load pressure appearing in line 31 plus the force of spring 34. A further increase in pressure in line 5 and passage 37 will cause the spool 36 to shift to the stroke-decrease position by admitting oil to passage 35. This causes the power pump 1 to decrease its output. Thus the steering load pressure appearing in line 31 combined with the force of spring 34 urges spool 36 of valve 33 toward a position which increases the stroke of pump 1. This urging of spool 34 is opposed by the pressure appearing in passage 37. These two operating pressures cause spool 36 to constantly modulate the pump stroking control so that output pressure in line 5 always equals steering load pressure in line 31 plus a constant differential pressure equal to the force of spring 34.

The operation of the system described above for a left turn is the same upon turning right except that valve 3 assumes the R position and fluid flows through line 5 into line 13, is metered by hand pump 9 into line 11 and on to line 15 to act upon the cylinder piston.

Pilot relief valve 39 in combination with orifice 43 limits maximum pilot pressure acting on spool 36 and thus limits the maximum pressure generated by power pump 1 in line 5.

Having described the preferred embodiment of our invention, it will be apparent to those skilled in the art that other modifications and arrangements may be made without departing from the true spirit and scope of the invention. For example, with reference to FIG. 1, a variable displacement pump biased to destroke could be used by merely interchanging the two positions of the presssure compensator valve 33. It is readily apparent also that our invention is applicable to other types of steering valves and other arrangements of steering load. For instance, a frame steered articulated vehicle or a trunnion steered three wheeled vehicle could incorporate the present invention. We claim as our invention all those modifications as come within the true spirit and scope of the following claims:

We claim:

1. A hydraulic steering circuit for an industrial vehicle comprising:

a supply of fluid within a reservoir;

passage means connecting the reservoir to a first variable displacement pump, the pump having a displacement control;

a hydraulic steering motor operatively connected to the pump and to a ground engaging wheel;

a steering valve interposed between the pump and the steering motor to selectively control pressure fluid to the steering motor;

a second fluid pump within the circuit for metering pressure fluid to the steering motor;

a pressure compensator valve connected to the pump outlet by a first fluid passage and to the pump displacement control by a second fluid passage, the compensator valve adapted to maintain a constant pressure differential between the first fluid passage and a third substantially unobstructed fluid passage by continuously modulating pressure fluid to the displacement control in response to changes in steering load pressure and flow demand within the steering valve;

the substantially unobstructed third fluid passage connecting the compensator valve to the steering valve, the steering valve adapted to route a steering load pressure signal taken directly from the steering valve to the compensator valve through the substantially unobstructed third fluid passage when a steering direction is selected and to isolate the third fluid passage from the steering load pressure when the steering valve is in a neutral steering position, the third fluid passage then being connected to the fluid reservoir.

2. Apparatus according to claim 1 wherein the third passage contains an orifice.

3. Apparatus according to claim 1 wherein the circuit includes valve means in combination with the orifice in the third passage to limit maximum pump discharge pressure by limiting the maximum steering load pressure signal in the third passage.

* * * * *